United States Patent
Phillips et al.

(10) Patent No.: US 7,656,860 B2
(45) Date of Patent: Feb. 2, 2010

(54) PERSONAL COMMUNICATION SERVICE NETWORK INTERFACE DEVICE

(76) Inventors: Bruce A. Phillips, 1342 Washburn St., Erie, CO (US) 80516; Steven M. Casey, 6265 W. Sumac Ave., Littleton, CO (US) 80123

( * ) Notice: Subject to any disclaimer, the term of this patent is extended or adjusted under 35 U.S.C. 154(b) by 933 days.

(21) Appl. No.: 10/625,863

(22) Filed: Jul. 22, 2003

(65) Prior Publication Data
US 2005/0018653 A1 Jan. 27, 2005

(51) Int. Cl.
*H04L 12/66* (2006.01)
(52) U.S. Cl. .................. 370/352; 370/401; 455/445; 379/211.04
(58) Field of Classification Search .................. None
See application file for complete search history.

(56) References Cited

U.S. PATENT DOCUMENTS

| | | | |
|---|---|---|---|
| 4,775,997 A | 10/1988 | West, Jr. et al. | |
| 4,989,230 A | 1/1991 | Gillig et al. | |
| 5,202,765 A | 4/1993 | Lineberry | |
| 5,454,032 A * | 9/1995 | Pinard et al. | 379/167.05 |
| 5,526,403 A | 6/1996 | Tam | |
| 5,635,980 A | 6/1997 | Lin et al. | |
| 5,740,075 A | 4/1998 | Bigham et al. | |
| 5,771,465 A | 6/1998 | Bojeryd | |
| 5,784,683 A | 7/1998 | Sistanizadeh et al. | |
| 5,923,379 A | 7/1999 | Patterson | |
| 5,971,921 A | 10/1999 | Timbel | |
| 5,983,068 A | 11/1999 | Tomich et al. | |
| 6,012,100 A | 1/2000 | Frailong et al. | |
| 6,069,899 A | 5/2000 | Foley | |
| 6,209,025 B1 | 3/2001 | Bellamy | |
| 6,282,189 B1 | 8/2001 | Eames | |
| 6,359,973 B1 | 3/2002 | Rahamim et al. | |
| 6,449,483 B1 * | 9/2002 | Akhteruzzaman et al. | ... 455/445 |
| 6,542,500 B1 | 4/2003 | Gerszberg et al. | |
| 6,687,374 B2 | 2/2004 | Leuca et al. | |
| 6,694,004 B1 * | 2/2004 | Knoerle et al. | 379/211.04 |
| 6,697,478 B1 * | 2/2004 | Meldrum et al. | 379/211.04 |
| 6,798,767 B1 * | 9/2004 | Alexander et al. | 370/352 |
| 6,816,582 B2 * | 11/2004 | Levine et al. | 379/211.04 |
| 6,882,714 B2 | 4/2005 | Mansfield | |
| 6,895,002 B2 * | 5/2005 | Shah et al. | 370/356 |

(Continued)

OTHER PUBLICATIONS

Frank, Edward and Holloway, Jack; "Connecting the Home with a Phone Line Network Chip Set", IEEE Micro, Mar.-Apr. 2000, pp. 2-14.

(Continued)

*Primary Examiner*—Hong Cho
*Assistant Examiner*—Robert C Scheibel

(57) ABSTRACT

According to the invention, a telephonic communication system for integrating wireless phone service with home phone service is disclosed. The telephone communication system includes a first communication and second communication channels and a telephone switch. The first communication channel is coupled to a wireless phone and the second communication channel is coupled to an interface that is coupled to one or more wired phones at a user location. The first and second communication channels are accessible with a single telephone number. The telephone switch is coupled to the first and second communication channels and determines if the first and second communication channels should be simultaneously sent an incoming phone call directed to the telephone number.

17 Claims, 6 Drawing Sheets

U.S. PATENT DOCUMENTS

| | | | |
|---|---|---|---|
| 6,898,413 B2 | 5/2005 | Yip et al. | |
| 7,145,899 B1 * | 12/2006 | Pearce et al. | 370/352 |
| 7,162,020 B1 * | 1/2007 | Forte | 379/201.01 |
| 7,190,969 B1 * | 3/2007 | Oh et al. | 455/551 |
| 2002/0037004 A1 | 3/2002 | Bossemeyer et al. | |
| 2002/0110115 A1 | 8/2002 | Gorman et al. | |
| 2002/0160780 A1 * | 10/2002 | Mukerjee et al. | 455/445 |
| 2002/0172345 A1 * | 11/2002 | Wu | 379/220.01 |
| 2003/0026416 A1 | 2/2003 | Fusco | |
| 2003/0095569 A1 * | 5/2003 | Wengrovitz et al. | 370/467 |
| 2003/0125072 A1 * | 7/2003 | Dent | 455/551 |
| 2004/0136373 A1 | 7/2004 | Bareis | |
| 2004/0170268 A1 * | 9/2004 | Hakusui | 379/211.02 |
| 2004/0213286 A1 | 10/2004 | Jette et al. | |

OTHER PUBLICATIONS

Frank, Edward et al., "Connecting The Home With A Phone Line Network Chip Set," IEEE Micro, pp. 2-14, Mar./Apr. 2000.

NextNet Wireless, "NextNet Expedience—NLOS Plug-And-Play Portable Customer Premise Equipment Integrated Radio Modem, Non Line-Of-Sight Broadband Wireless Residential Subscriber Unit (RSU-2510A)," 2 pages, 2003.

* cited by examiner

PERSONAL COMMUNICATION SERVICE NETWORK INTERFACE DEVICE

This application incorporates by reference in their entirety U.S. patent application Ser. No. 10/367,597, now U.S. Pat. No. 7,433,465, filed on Feb. 14, 2003, entitled "SYSTEMS AND METHODS FOR PROVIDING APPLICATION SERVICES"; U.S. patent application Ser. No. 10/356,364, now U.S. Pat. No. 7,180,988, filed on Jan. 31, 2003, entitled "PACKET NETWORK INTERFACE DEVICE AND SYSTEMS AND METHODS FOR ITS USE."

BACKGROUND OF THE INVENTION

This invention relates in general to telephone systems and, more specifically, to integration of wireless phone service with other services.

Wireless phones have become increasingly popular among phone users. Typically, a phone user has wired phones at their work or residence that connects to the Public Switched Telephone Network (PSTN) system. Those users having both wireless and wired phones have a different phone number for each telephone communication channel. Callers to the user have to determine which number to call. If a message is left using either phone number, it may not be easily accessible from the other phone(s).

There is a trend away from wired PSTN service. Some phone users choose only wireless service, while others have gone to VOIP service. Where there are multiple phones, possibly using multiple transportation networks, further integration is generally desirable. As the trend away from PSTN continues, integration of the various telecommunication channels is attractive.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Figure 1:
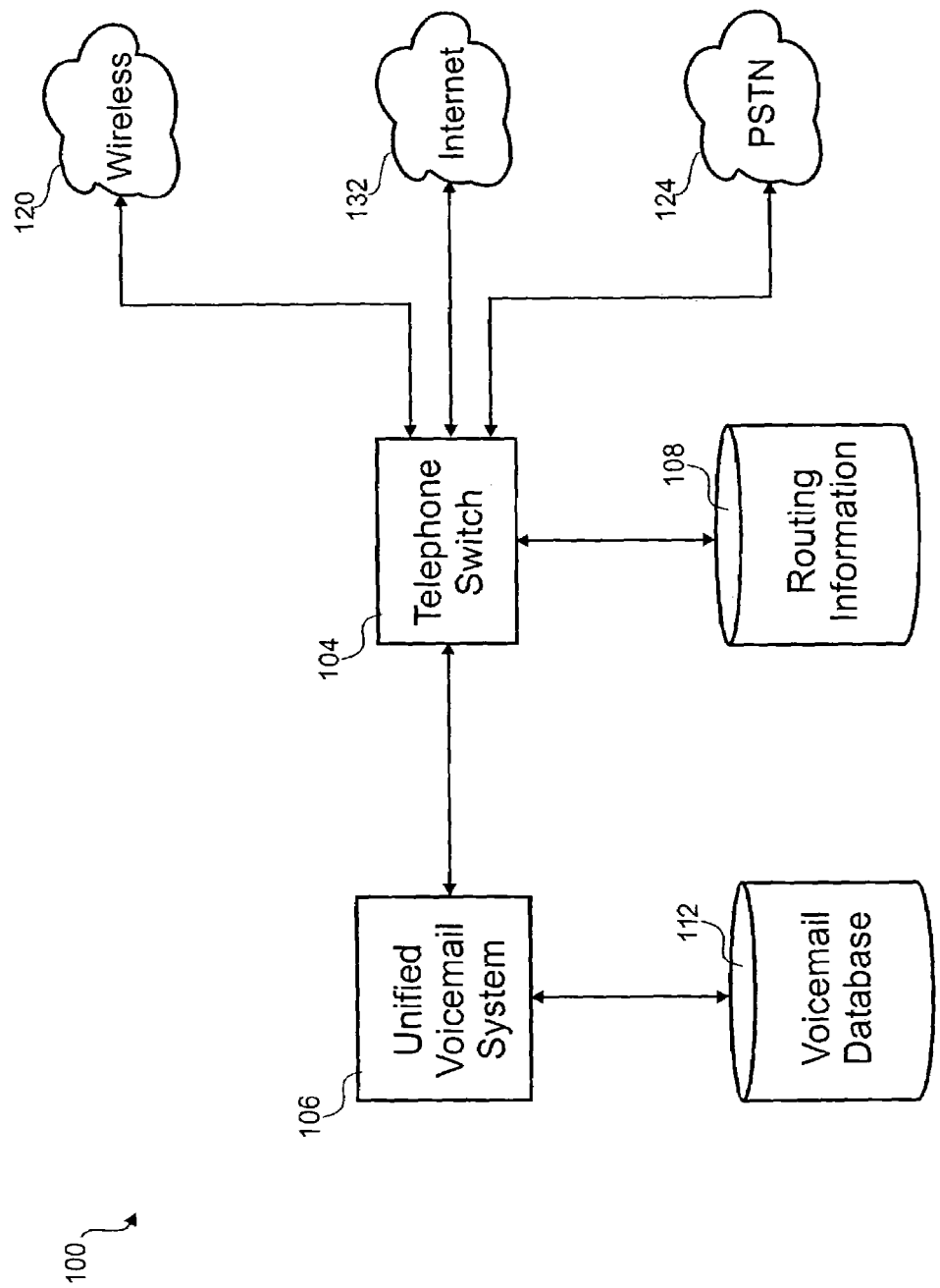
FIG. 1 is a block diagram of an embodiment of a voice switching system.

Referring first to FIG. 1, a block diagram of an embodiment of a voice switching system 100 is shown. In this embodiment, the telephone switch 104 can bridge voice traffic among a wireless transport network 120, an Internet transport network 132 and a PSTN transport network 124. Calls originate and terminate with one of these networks 120, 124, 132.

The telephone switch 104 relays calls between the various networks 120, 124, 132 that terminate and/or originate phone calls. Signaling and/or header information associated with the voice data informs the telephone switch 104 where to route the call. For example, the telephone switch 104 could receive a call from the PSTN telephone network 124 with a phone number that provisionally sends the call to both the Internet transport network 132 and the wireless transport network 120.

To redirect phone calls, the telephone switch 104 checks a routing information database 108. The terminating end of the phone call could use one or more of the networks 120, 124, 132 or two datapaths in the same network 120, 124, 132. For example the telephone switch 104 could receive a call for a particular number. A check of the routing information database 108 may indicate that the call should be provisionally sent to a wireless phone and a home phone that uses the wireless network for connectivity. Both the wireless phone and the home phone would ring until the call was answered. The telephone switch would stop ringing on both phone paths and route the call to the phone that was answered. In another example, the phone number routing information would indicate the call should be provisionally routed to a wireless phone, a session initiated protocol (SIP) phone and a plain old telephone service (POTS) phone using all three networks 120, 124, 132.

The routing information database 108 can be updated periodically by the user manually changing routing or by automatic detection of phone availability. For example, with a user having a wireless phone and wired phone, only the wired phone would ring if the wireless phone were turned off or otherwise unavailable. Some embodiments could route all calls to one of the available phones when they are in close proximity. For example, when the wireless phone is in the house with the wired phones, an incoming phone call could only ring the wired phones if the user so specified.

The various networks 120, 124, 132 could include any number of distinct or partially distinct networks. In this way, there could be many networks. The wireless network 120 could use WIFI™, microwave, satellite, ultra-wide band (UWB), laser data transport, cellular phone (e.g., CDMA, GSM, TDMA, AMPS, etc.), cellular wireless data, and/or other wireless networks. The Internet network 132 could use optical fiber, coaxial cable mode, DSL, power line data, ethernet, and/or other packet switched networks. Voice over Internet protocol (VOIP) or circuit switched methodologies could be used on the various networks 120, 124, 132. Some networks could be hybrids-of other networks. For example, a phone call may originate with a PSTN network 124, but be converted into a VOIP transport using the Internet 132 before reaching the telephone switch 104.

If no terminal device answers a phone call, a unified voice mail system 116 could capture a digitized message. This service is optional. The voice mail system 116 is accessible to any phone call from any of the networks 120, 124, 132 and could be accessible through a web or application interface on a computer. Messages are stored in a voice mail database 112.

Figure 2A:
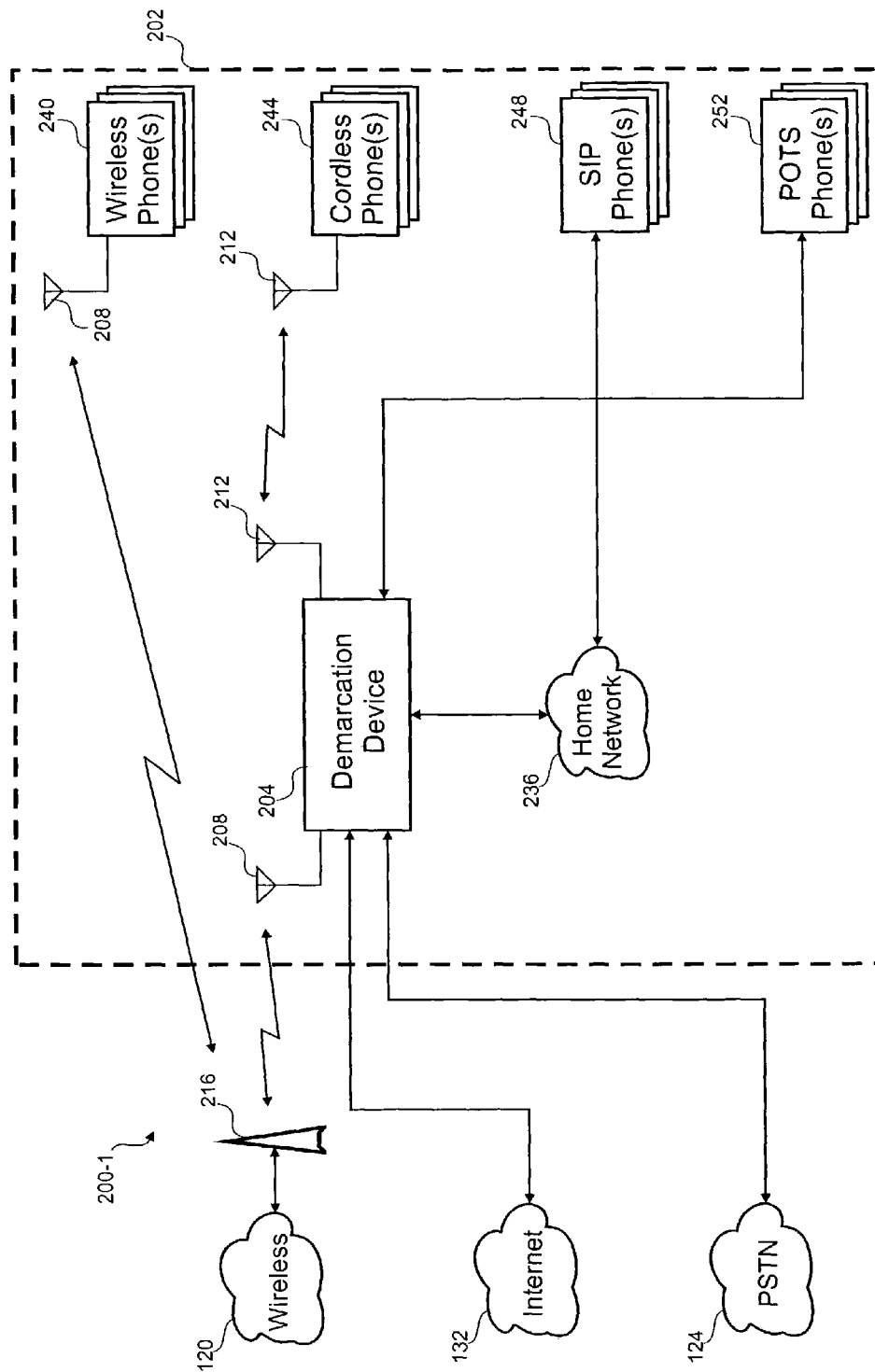
FIG. 2A is a block diagram of an embodiment of a telephone system.

With reference to FIG. 2A, a block diagram of an embodiment of a telephone system 200-1 is shown. In this embodiment, any of the various networks 120, 124, 132 can interface with the user equipment 202. The wireless transport network 120 uses an antenna 216, the Internet transport network 132 uses any of the Internet access media and the PSTN transport network 124 uses circuit switched media to communicate with the user equipment 102. The user equipment could be tied to the user location or could rely upon wireless or cordless technology. This embodiment shows connectivity with all three network categories 120, 124, 132, but a typical user would only choose a subset of the possibilities. For example, the user may have a POTS phone(s) 252 and a wireless phone 240.

The user equipment 202 in this embodiment could include a wireless phone(s) 240 or other phones interfaced to a demarcation device 204. The wireless phone 240 communicates with the wireless network 120 using an antenna 208, but a cordless phone(s) 244, a SIP phone 248 and a POTS phone 252 channel their communication through the demarcation device 204 before coupling to any network 120, 124, 132.

The cordless phone 244 uses an antenna 212 to communicate with a base station in the demarcation device 204. Typically, the range of cordless phones 244 is limited to a few hundred feet and uses unlicensed RF spectra (e.g., 2.4 GHz, 5 GHz, 900 MHz, etc.) in the United States. Some embodiments could have multiple cordless phones using the same RF frequencies or different ones. The demarcation device 204 could support the various frequencies or selectively support them by having a modular design or allowing various frequencies to be activated as cordless phones 244 are added to the system 200-1.

SIP phones 248 use VOIP technology to allow communicating conversations over a packet switched home network 236. Typically, the SIP phone 248 has a network port such as ethernet, HPNA, or DSL to support communication over the home network 236. There could be various routers, bridges and/or switches within the home network 236 to support the SIP phones 248. Where there are multiple SIP phones in a user location, each could be active at the same time so long as the networks 120, 124, 132 could support the simultaneous connections. The home network 236 could be used by computers also. In one embodiment, the routing characteristics and any configuration for the demarcation device is accessed through an application and/or web interface using the home network 236. This interface could be securely accessible from the Internet network 132 also in some embodiments.

POTS phones 252 are traditional phones that natively operate with a PSTN network 124. The demarcation device 204 supports these ubiquitous phones. These phones 252 could be cordless in some embodiments as is well known in the art. Some user locations could have multiple POTS phones 252 on the same line or spread among a number of lines.

The various phones is a given embodiment could have the same phone number and/or different phone numbers. For example, a POTS phone 252 could have a phone number that would ring only that phone, while another number would ring all phones 244, 248, 252 associated with the user. The routing information database 108 is updated with changes in the association between phones and numbers. Outgoing calls from one phone circuit may or may not tie-up the other phone circuits, as dictated by the calling plan. For example, the SIP phone 248 of a user may be tied up with an incoming call, but other outgoing calls could be make on the POTS phone 252.

The demarcation device 204 is interposed between some of the phone types 244, 248, 252 and the various transport networks 120, 124, 132. Translations between formats can be performed by the demarcation device 204 such that any network 120, 124, 132 can communicate with any phone 244, 248, 252 coupled to the demarcation device 204. For example, the Internet network 132 could be coupled to the POTS telephone 252 using the demarcation device 204. In this embodiment, the demarcation device 204 is accessible from outside the building such that upgrades and repair can be performed without access to the interior of the home or office. In other embodiments, the demarcation device could be inside the building.

For the wireless phone(s) 240, the demarcation device 204 may also communicate using a docking cradle coupled to the demarcation device 204, a wireless data channel (e.g., WIFI™ or BLUETOOTH™), and/or a channel through the wireless network 120. Communication from the wireless phone 240 the demarcation device 204 allows sharing location information such that the demarcation device 204 can determine when the wireless phone is nearby and inform the telephone switch 104 such that routing could be affected.

Figure 2B:
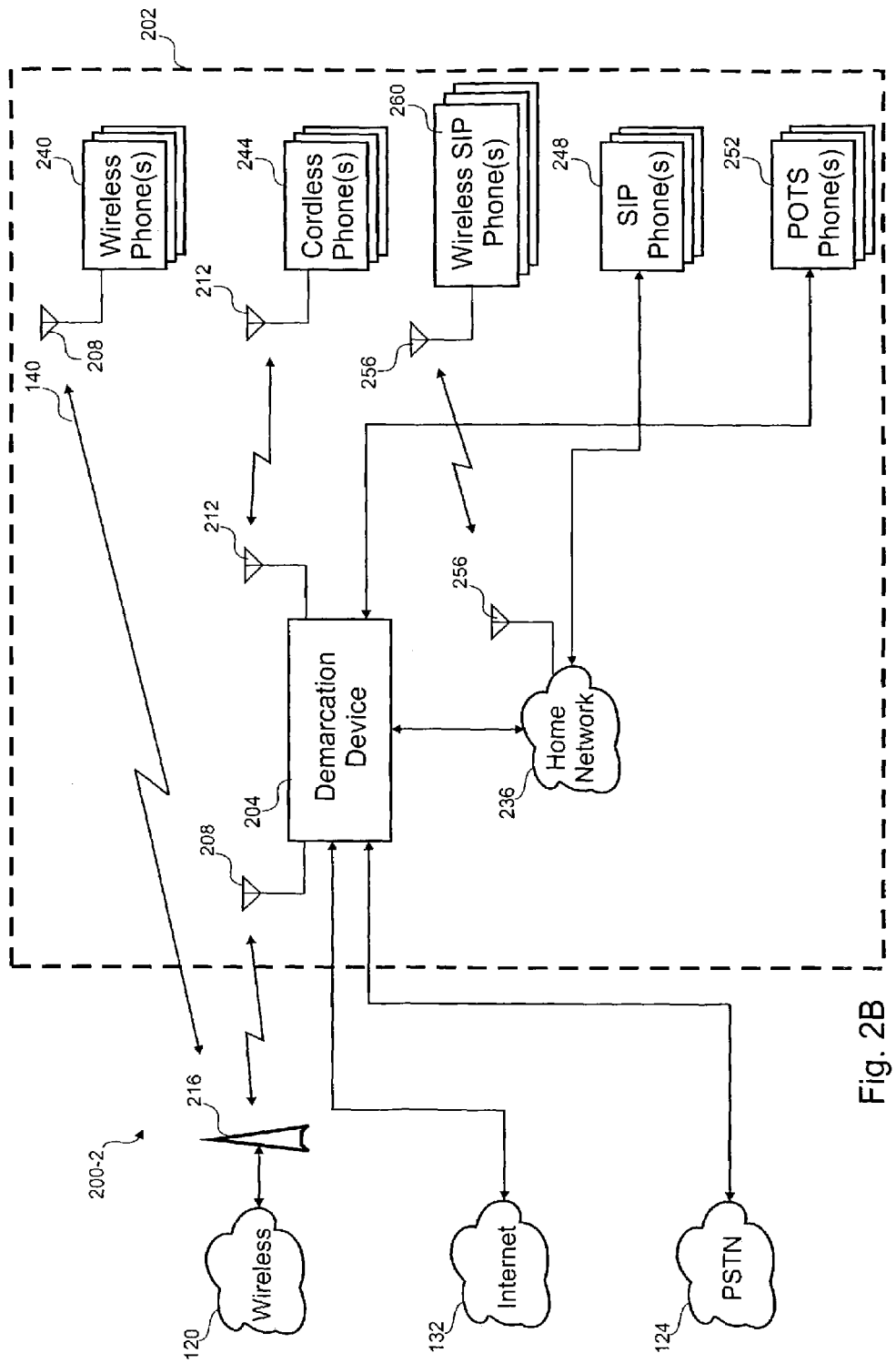
FIG. 2B is a block diagram of another embodiment of a telephone system.

Referring next to FIG. 2B, a block diagram of another embodiment of a telephone system 200-2 is shown. This embodiment adds another type of phone, namely, a wireless SIP phone 260 that communicates with the demarcation device 204 wirelessly using the home network 236. Any wireless data protocol could be used, for example WIFI™ or BLUETOOTH™. The home network 236 would include a wireless router or access point. In some embodiments, the home network 236 hardware could be integrated into the demarcation device 204.

Figure 2C:
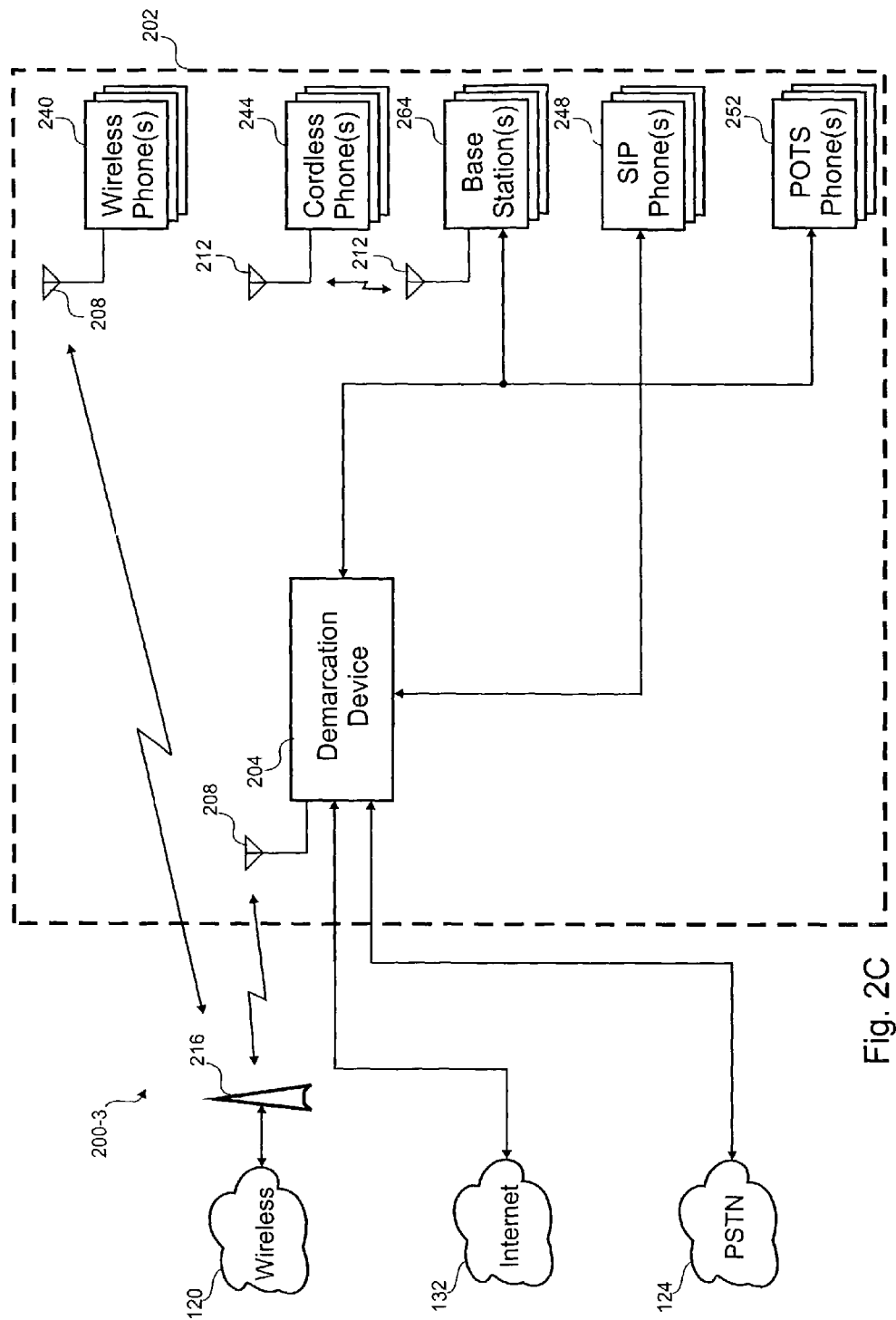
FIG. 2C is a block diagram of yet another embodiment of a voice switching system.

With reference to FIG. 2C, a block diagram of yet another embodiment of a voice switching system 200-3 is shown. This embodiment shows a base station(s) 264 broken out separately from the demarcation device 204. The cordless phone(s) 244 communicate with the base station 264 to interface with the demarcation device 204. Some embodiments could use a combination of base stations internal and external to the demarcation device 204. This embodiment integrates the hardware of the home network into the demarcation device 204 such that the SIP phone(s) 248 connect directly with the demarcation device 204.

Figure 3:
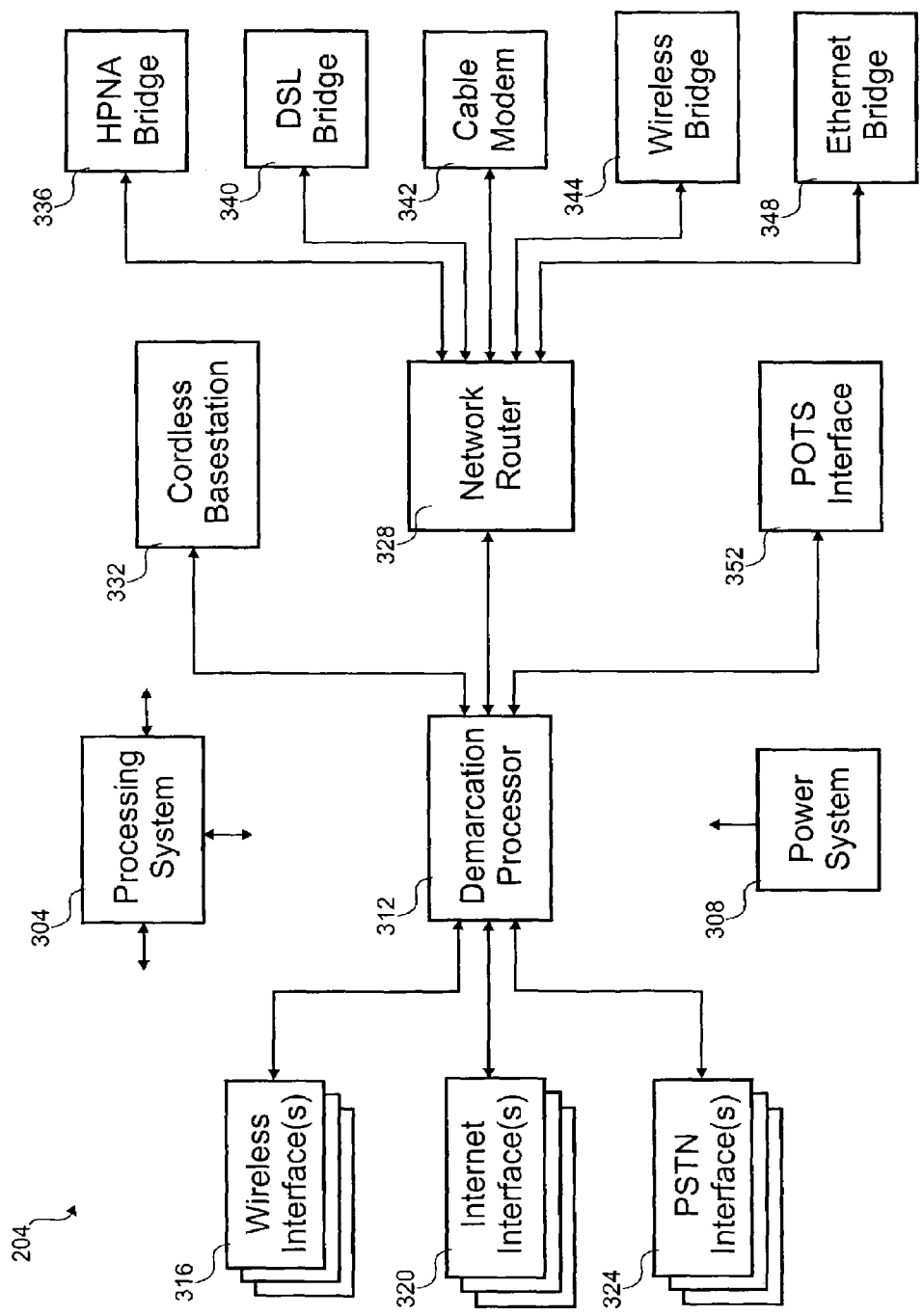
FIG. 3 is a block diagram of an embodiment of a demarcation device.

Referring next to FIG. 3, a block diagram of an embodiment of a demarcation device 204 is shown. A processing system 304 controls operation of the demarcation device and is coupled to other blocks in the demarcation device 204. Also, a power system 308 is used to provide power to blocks in the demarcation device 204. The power system receives its power from either one or more of the networks and/or from within the building.

The demarcation device 204 can be partially accessible by the network employees and partially accessible by both the network employees and user. In this way, the user can upgrade certain components on the demarcation device 204 without a service call. In some embodiments, the demarcation device 204 could be housed in several enclosures linked together in some way. This embodiment of the demarcation device 204 shows many of the optional interfaces, but a typical implementation will have a subset of these interfaces or disable those ones that are unused.

The interfaces to the network fall into three general categories, namely, wireless interface(s) 316, Internet interface(s)

320, and PSTN interface(s) 324. These interfaces 316, 320, 324 are coupled to their respective transport networks 120, 124, 132. The interfaces 316, 320, 324 could be used to transport non-voice traffic. For example, home computers could be coupled to a cable modem Internet interface 320. The interfaces 316, 320, 324 convert the received signals into a digital format for the demarcation processor 312. In some cases, the interface 324 passes through an analog signal for the phone call that can be sent to another analog channel, for example, a call received on the PSTN interface 324 could be coupled directly to a POTS interface 352 with little or no modification.

The demarcation processor 312 processes the phone calls by cross routing them to different types of phone transports supported within the building. The phone transports are optional and upgradeable in this embodiment. The voice calls for this embodiment are sent using one or more of a cordless basestation 332, the POTS interface 352, and/or a packet switched bridge. There are various types of bridges supported, for example, a HPNA bridge 336, a DSL bridge 340, a cable modem bridge 342, a wireless bridge 344, an ethernet bridge 348, and an ethernet bridge 348. The various bridges 336, 340, 342, 344, 348 are logically coupled together with a network router 328 such that a SIP phone 248 on the DSL bridge 340 could work with another SIP phone 248 on the HPNA bridge 336, for example.

Figure 4:
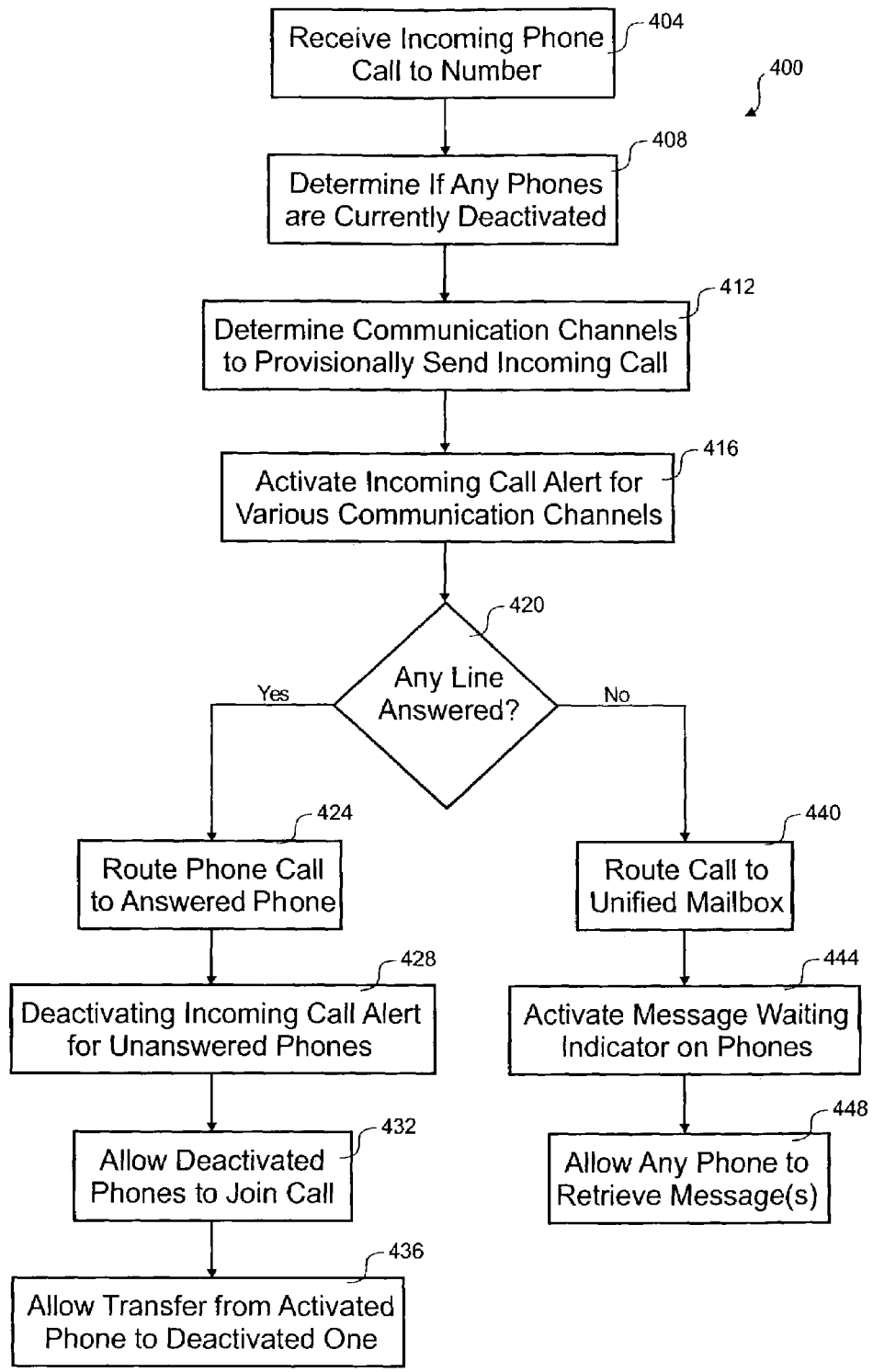
FIG. 4 is a flow diagram of an embodiment of a process for integrating wireless service with home phone service.

With reference to FIG. 4, a flow diagram of an embodiment of a process 400 for integrating wireless service with home phone service is shown. The depicted portion of the process 400 begins in step 404 where a phone call is received to a number that will activate at least two different voice datapaths.

The telephone switch 104 generally determines where the phone call should be routed in this embodiment. In step 408, the routing information database 108 has recorded if any of the possible phones have been deactivated. When a SIP phone 248 stops sending and/or responding to periodic checks, it can be presumed it has been disconnected from the network 132 or is turned off. A wireless phone 240 could notify the routing information database 108 when deactivated or could just stop responding to polls to indicate the phone 240 is off or out of service. In step 412, the communication channels associated with the phone number that are available are determined. Some embodiments could skip steps 408 and 412 and just blindly sent out calls such that phones that are currently active would respond, while others would not.

In step 416, the available phones associated with the phone number are activated. If the phone call is not answered by any phone on any communication channel as determined in step 420, processing continues to step 440 to take a message in a unified voice mailbox. In step 444, a message waiting indicator is activated for all phones associated with the telephone number that support that feature. Other embodiments could avoid use of a unified mailbox and only send messages to phones on one of the communication channels, although, a number could be provided for phones on the other communication channels to receive the messages. In step 448, the voice mail messages are available for retrieval.

If it is determined that any communication channel line is answered in step 420, alternative processing begins in step 424. The telephone switch 104 routes the phone call to the phone that picked-up the line in step 424. In step 428, the phones that did not pickup the line stop ringing. Status information on the phone that did not answer could indicate that the other communication channel is active. In step 432, the unanswered communication line could optionally join in the conversation by activating a button or keypad code, for example. Further, a phone on one communication channel could optionally transfer the call to another communication channel phone in step 436.

A number of variations and modifications of the invention can also be used. For example, some embodiments could arbitrate between various wireless, cordless, VOIP, and wired phones in any combination. All phones could be accessible with a single telephone number while also having an optional individual number. When a call is sent to the common number, all phones will simultaneously ring even though the phones are not necessarily nearby each other. If one is answered, the others stop ringing. The other phones can join the conversation. Also, one phone can transfer the call to another phone in the calling group.

While the principles of the invention have been described above in connection with specific apparatuses and methods, it is to be clearly understood that this description is made only by way of example and not as limitation on the scope of the invention.

What is claimed is:

1. A telephonic communication system for integrating wireless phone service with home phone service, the telephonic communication system disposed at a user location, the telephonic communication system comprising:

a wireless phone, wherein incoming phone calls are directed to the wireless phone with a wireless telephone number for the wireless phone over a wireless network;

a first communication channel to a cordless phone at the user location;

a second communication channel to one or more wired phones at the user location, wherein the first and second communication channels are accessible with a second telephone number;

a third communication channel coupled to one or more SIP phones at the user location; and a demarcation device coupled to the first, second, and third communication channels, the demarcation device communicatively coupled with the wireless network via a wireless interface, the demarcation device disposed at the user location, the demarcation device interposed between the first, second, and third communication channels, the demarcation device interposed between a PSTN and the one or more wired phones at the user location wherein the wired phones channel communications through the demarcation device before the PSTN, the demarcation device interposed between the PSTN and the cordless phone wherein the cordless phone channels communications through the demarcation device before the PSTN, the demarcation device interposed between the Internet and the wired phones, and wherein the demarcation device is interposed between the Internet and the one or more SIP phones and the SIP phones channel communications through the demarcation device before the Internet, wherein the demarcation device receives an incoming phone call on the wireless network directed to the wireless telephone number for the wireless phone, and wherein the demarcation device determines if the first, second, and third communication channels should be simultaneously sent the incoming phone call directed to the wireless telephone number for the wireless phone.

2. The telephonic communication system for integrating wireless phone service with home phone service as recited in claim 1, wherein the wireless phone and the wireless network uses one of GSM, CDMA, AMPS, and TDMA transport.

3. The telephonic communication system for integrating wireless phone service with home phone service as recited in claim 1, wherein the demarcation device is located at the user's home.

4. The telephonic communication system for integrating wireless phone service with home phone service as recited in claim 1, wherein the demarcation device provisionally sends the incoming phone call to the first and second communication channel until acceptance of the incoming phone call when one of the first and second communication channels receives the incoming phone call and the other of the first and second communication channel is disconnected from the incoming phone call.

5. The telephonic communication system for integrating wireless phone service with home phone service as recited in claim 1, wherein:
   the second communication channel can join the incoming phone call of the first communication channel, and
   the phone call can be manually transferred from the second communication channel to the first communication channel.

6. The telephonic communication system for integrating wireless phone service with home phone service as recited in claim 1, wherein the wireless interface is one of a wireless cellular interface, a PSTN interface, and a VOIP interface.

7. The telephonic communication system for integrating wireless phone service with home phone service as recited in claim 1, wherein the first communication channel uses different physical transport within the user location from the second communication channel.

8. A method for integrating wireless phone service with home phone service at a user facility, the method comprising steps of:
   routing an incoming phone call to a demarcation device, the incoming phone call is directed to a wireless phone with a wireless telephone number;
   receiving the incoming phone call at the demarcation device the demarcation device having a wireless interface, the demarcation device disposed at the user facility, the demarcation device coupled to one or more wired phones at the user facility, the demarcation device interposed between a PSTN and the one or more wired phones at the user facility and accessible with a second phone number, the demarcation device interposed between an Internet and the one or more wired phones, and the demarcation device interposed between the Internet and one or more SIP phones at the user facility;
   determining with the demarcation device if the wireless phone should be sent the incoming phone call; and
   determining with the demarcation device if the incoming phone call should be routed to one or more of the wired phones and SIP phones; and
   routing the incoming phone call to one or more of the wired phones and SIP phones.

9. The method for integrating wireless phone service with home phone service as recited in claim 8, wherein determining if the wireless phone should be sent the incoming phone call comprises:
   detecting if the one or more wired phones or one or more SIP phones have been answered;
   if the one or more wired phones or one or more SIP phones have been answered, terminating the incoming phone call to the wireless phone;
   if the one or more wired phones or one or more SIP phones have not been answered, detecting if the wireless phone has been answered;
   if the wireless phone has been answered, terminating the incoming phone call to the one or more wired phones and one or more SIP phones; and
   if the one or more wired phones or one or more SIP phones have not been answered and if the wireless phone has not been answered, sending the incoming phone call to a voice mail system.

10. The method for integrating wireless phone service with home phone service as recited in claim 9, wherein the one or more wired phones, the one or more SIP phones, and the wireless phone use a unified voice mailbox.

11. A method performed in a telephone switch for integrating wireless phone service with home phone service, the method comprising steps of:
   routing an incoming phone call to a wireless phone, the incoming phone call is directed to the wireless phone with a wireless telephone number for the wireless phone;
   routing the incoming phone call to a demarcation device having a wireless interface, the demarcation device disposed at a user location, the demarcation device coupled to one or more wired phones at the user location, the demarcation device interposed between the one or more wired phones and a phone call transport network, the demarcation device interposed between an Internet and the one or more wired phones, and between the Internet and one or more SIP phones at the user location, wherein the wired phones channel communications through the demarcation device before the phone call transportation network, wherein the SIP phones channel communications through the demarcation device before the Internet, wherein the one or more wired phones are accessible with a second telephone number, and wherein the first and second-listed routing steps are performed, at least partially, simultaneously;
   determining with the demarcation device if the wireless phone should be sent the incoming phone call;
   determining with the demarcation device if the one or more wired phones or one or more SIP phones should be sent the incoming phone call; and
   routing the incoming phone call to at least one of the wireless phone, one of the wired phones, or the SIP phone, based on the determining steps.

12. The method for integrating wireless phone service with home phone service as recited in claim 11, wherein the demarcation device interface wirelessly couples the one or more wired phones to the phone call transport network.

13. The method for integrating wireless phone service with home phone service as recited in claim 11, wherein the firstlisted determining step comprises a step of detecting if the one or more wired phones or one or more SIP phones have been answered.

14. The method for integrating wireless phone service with home phone service as recited in claim 11, wherein determining if the one or more wired phones or one or more SIP phones should be sent the incoming phone call comprises detecting if the wireless phone has been answered.

15. The method for integrating wireless phone service with home phone service as recited in claim 13, wherein if the one or more wired phones or one or more SIP phones have been answered, stopping the routing of the incoming phone call to the wireless phone.

16. The method for integrating wireless phone service with home phone service as recited in claim 14, wherein if the wireless phone has been answered, stopping the routing of the incoming phone call to the one or more wired phones and one or more SIP phones.

17. The method for integrating wireless phone service with home phone service as recited in claim 11, wherein if none of the one or more wired phones, one or more SIP phones, or the wireless phone has been answered, sending the incoming phone call to a unified voice mail system.

* * * * *

UNITED STATES PATENT AND TRADEMARK OFFICE
CERTIFICATE OF CORRECTION

PATENT NO. : 7,656,860 B2 Page 1 of 1
APPLICATION NO. : 10/625863
DATED : February 2, 2010
INVENTOR(S) : Bruce A. Phillips and Steven M. Casey It is certified that error appears in the above-identified patent and that said Letters Patent is hereby corrected as shown below:

Column 2, Line 60, replace "hybrids-of other" with "hybrids of other", therefor.

Column 3, Line 67, replace "make" with "made", therefor.

Column 4, Line 65, replace "those ones that are" with "those that are", therefor.

Column 5, Line 22 and 23, replace "an ethernet bridge 348, and an ethernet bridge 348" with "an ethernet bridge 348", therefor.

Column 5, Line 47, replace "sent" with "send", therefor.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,656,860 B2 Page 1 of 1
APPLICATION NO. : 10/625863
DATED : February 2, 2010
INVENTOR(S) : Phillips et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1243 days.

Signed and Sealed this

Thirtieth Day of November, 2010

David J. Kappos
*Director of the United States Patent and Trademark Office*